(12) United States Patent
Kanamarlapudi et al.

(10) Patent No.: US 9,491,103 B2
(45) Date of Patent: Nov. 8, 2016

(54) INTRODUCING UNCOMPRESSED PACKETS IN COMPRESSION FLOW BASED ON FLOW CONTROL

(71) Applicant: QUALCOMM Incorporated, San Diego, CA (US)

(72) Inventors: Sitaramanjaneyulu Kanamarlapudi, San Diego, CA (US); Rohit Kapoor, San Diego, CA (US); Sanjay Chacko Verghese, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 14/521,231

(22) Filed: Oct. 22, 2014

(65) Prior Publication Data

US 2015/0249610 A1  Sep. 3, 2015

Related U.S. Application Data

(60) Provisional application No. 61/946,528, filed on Feb. 28, 2014.

(51) Int. Cl.
*H04L 12/815* (2013.01)
*H04L 12/911* (2013.01)
*H04L 12/863* (2013.01)
*H04L 12/811* (2013.01)

(52) U.S. Cl.
CPC .............. *H04L 47/22* (2013.01); *H04L 47/38* (2013.01); *H04L 47/50* (2013.01); *H04L 47/78* (2013.01)

(58) Field of Classification Search
CPC ....... H04L 47/22; H04L 47/78; H04L 47/50; H04L 47/38
See application file for complete search history.

(56) References Cited

U.S. PATENT DOCUMENTS 7,068,599 B1   6/2006  Jiang et al.
8,081,606 B2 * 12/2011  Cai ................... H04L 12/5695
                                                  370/336

(Continued)

FOREIGN PATENT DOCUMENTS

EP   2 086 185 A1   8/2009
GB     2481718 A   1/2012

(Continued)

OTHER PUBLICATIONS

International Search Report and Written Opinion—PCT/US2015/017100—ISA/EPO—Apr. 16, 2015 (12 total pages).

*Primary Examiner* — Christopher Grey
(74) *Attorney, Agent, or Firm* — Arent Fox LLP

(57) ABSTRACT

Methods and apparatus are described for introducing uncompressed data packets in to the into a compression flow during compression for communication between a user equipment (UE) and a network entity, comprising placing a plurality of data packets in an uncompressed uplink queue of the UE; determining that an amount of data packets in a compressed uplink queue of the UE fails to satisfy a grant threshold; and transferring one or more of the plurality of data packets to the compressed uplink queue from the uncompressed uplink queue based on the determination that the amount of data packets in the compressed uplink queue fails to satisfy the grant threshold, wherein the one or more of the plurality of data packets in the compressed uplink queue are scheduled for transmission to the network entity as one or more uncompressed data packets.

30 Claims, 11 Drawing Sheets

(56) References Cited

U.S. PATENT DOCUMENTS

| | | |
|---|---|---|
| 8,681,694 B2 | 3/2014 | Fischer |
| 2004/0030847 A1* | 2/2004 | Tremaine ............ G06F 12/023 711/154 |
| 2009/0046639 A1 | 2/2009 | Cai et al. |

FOREIGN PATENT DOCUMENTS

| | | |
|---|---|---|
| WO | WO-2008/024289 A2 | 2/2008 |
| WO | WO-2009/008817 A1 | 1/2009 |
| WO | WO-2013/186273 A1 | 12/2013 |
| WO | WO-2014/005440 A1 | 1/2014 |

* cited by examiner

INTRODUCING UNCOMPRESSED PACKETS IN COMPRESSION FLOW BASED ON FLOW CONTROL

CLAIM OF PRIORITY UNDER 35 U.S.C §119

The present Application for Patent claims priority to U.S. Provisional Application No. 61/946,528 entitled "METHOD TO INTRODUCE UNCOMPRESSED PACKETS IN COMPRESSION FLOW BASED ON FLOW CONTROL" filed Feb. 28, 2014, Qualcomm Ref. No. 143705P1 assigned to the assignee hereof and hereby expressly incorporated herein by reference.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In a user equipment (UE) operating on a wireless communication network, when the data is bursty from the application perspective, then this will result in bursty traffic in the uplink. When compression is not used (e.g., a Compressor does not compress the data), then the radio link control (RLC) layer entity can pick up the data from a Watermark component, which holds data to be transmitted, and can build packet data units (PDUs) instantaneously to meet the PHY (physical layer entity) requirements. When data is to be compressed by a compressor or compression engine, which is processor resource intensive, then the operation of the compressor might add further delay in providing sufficient compressed data to meet the PHY requirements in every frame. As a result, the UE may experience under-utilization of granted transmission resources, leading to reductions in such resource grants and to further delays.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present methods relate to introducing uncompressed data packets into a compression flow during compression for communication between a user equipment (UE) and a network entity, comprising placing a plurality of data packets in an uncompressed uplink queue of the UE; determining that an amount of data packets in a compressed uplink queue of the UE fails to satisfy a grant threshold; and transferring one or more of the plurality of data packets to the compressed uplink queue from the uncompressed uplink queue based on the determination that the amount of data packets in the compressed uplink queue fails to satisfy the grant threshold, wherein the one or more of the plurality of data packets in the compressed uplink queue are scheduled for transmission to the network entity as one or more uncompressed data packets.

In accordance with an aspect, the present computer-readable medium storing computer executable code relates to introducing uncompressed data packets into a compression flow during compression for communication between a user equipment (UE) and a network entity, comprising code for placing a plurality of data packets in an uncompressed uplink queue of the UE; code for determining that an amount of data packets in a compressed uplink queue of the UE fails to satisfy a grant threshold; and code for transferring one or more of the plurality of data packets to the compressed uplink queue from the uncompressed uplink queue based on the determination that the amount of data packets in the compressed uplink queue fails to satisfy the grant threshold, wherein the one or more of the plurality of data packets in the compressed uplink queue are scheduled for transmission to the network entity as one or more uncompressed data packets.

In accordance with an aspect, the apparatus relates to introducing uncompressed data packets into a compression flow during compression for communication between a user equipment (UE) and a network entity, comprising means for placing a plurality of data packets in an uncompressed uplink queue of the UE; means for determining that an amount of data packets in a compressed uplink queue of the UE fails to satisfy a grant threshold; and means for transferring one or more of the plurality of data packets to the compressed uplink queue from the uncompressed uplink queue based on the determination that the amount of data packets in the compressed uplink queue fails to satisfy the grant threshold, wherein the one or more of the plurality of data packets in the compressed uplink queue are scheduled for transmission to the network entity as one or more uncompressed data packets.

In accordance with an aspect, the apparatus relates to introducing uncompressed data packets into a compression flow during compression for communication between a user equipment (UE) and a network entity, comprising a balancing component configured to place a plurality of data packets in an uncompressed uplink queue of the UE; a determining component configured to determine that an amount of data packets in a compressed uplink queue of the UE fails to satisfy a grant threshold; and a transferring component configured to transfer one or more of the plurality of data packets to the compressed uplink queue from the uncompressed uplink queue based on the determination that the amount of data packets in the compressed uplink queue fails to satisfy the grant threshold, wherein the one or more of the plurality of data packets in the compressed uplink queue are scheduled for transmission to the network entity as one or more uncompressed data packets.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
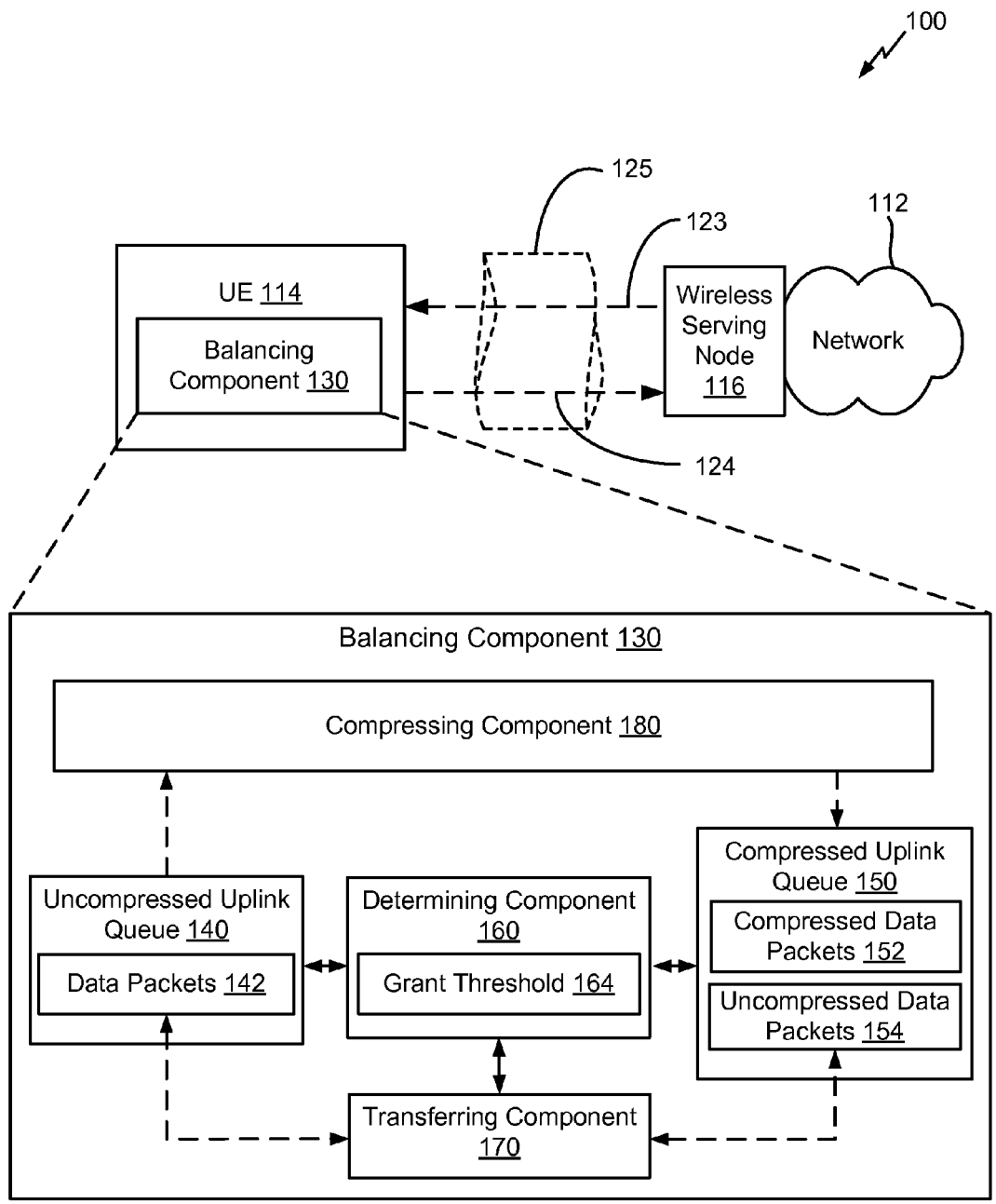
FIG. 1 is a schematic diagram of an aspect of a wireless communication system of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be one or more of hardware, firmware and/or software, and may be divided into other components.

The present aspects generally relate to efficiently introducing uncompressed data packets in to the compressed uplink queue to be scheduled for transmission to the network. Specifically, a UE may initialize compression mode. When operating in compression mode, a compressor requires some processing time to compress data packets and generate corresponding compressed data packets because each data packet needs to be analyzed for static portions that are replaced by pointers pointing to locations in the compressor memory. For example, a compressor compresses data packets in regular time frames and keeps the compressed data in another queue called a compressed uplink queue to ensure that, during packet data unit (PDU) building, the compressed data is readily available so that PDU building may be completed in a timely fashion. In some instances, such as during bursty periods, a large amount of data may be introduced for transmission. In these instances, compressing will still require a corresponding amount of time to compress each of the data packets. In certain instances, the compression procedure may require an unusually long amount of time thereby causing a delay in transmission. If the compressor is delayed in compressing data packets due to MIPS intensive activity, then the UE may see under-utilization of the scheduled grant at the PHY layer transmission even though there is data to be transmitted, but has yet to be compressed. Due to under-utilization, the UE may have its scheduled grant reduced by the network.

Accordingly, in some aspects, the present methods and apparatuses may provide an efficient solution, as compared to current solutions, by introducing uncompressed data packets in to the compressed uplink queue to be scheduled for transmission to the network. In other words, while the compressor is in the process of compressing the packets, uncompressed packets may be scheduled for uplink transmission until the compressed uplink queue is full. Thus, the UE 114 may achieve a smooth uplink throughput on the PHY layer without under-utilization of the grant irrespective of compression gains and the bursty nature of the data packets being received. As a result, a balance may be obtained between compression gains and overall delay, such as uplink data throughput and/or time.

Referring to FIG. 1, in one aspect, a wireless communication system 100 is configured to facilitate transmitting vast amount of data from a mobile device to a network at a fast data transfer rate, or vice versa, by introducing uncompressed data packets in to compression flow during compression. Wireless communication system 100 includes at least one user equipment (UE) 114 that may communicate wirelessly with one or more network 112 via serving nodes, including, but not limited to, wireless serving node 116 over one or more wireless link 125. The one or more wireless link 125, may include, but are not limited to, signaling radio bearers and/or data radio bearers. Wireless serving node 116 may be configured to transmit one or more signals 123 to UE 114 over the one or more wireless link 125, and/or UE 114 may transmit one or more signals 124 to wireless serving node 116. In an aspect, signal 123 and signal 124 may include, but are not limited to, one or more messages, such as transmitting a data from the UE 114 to network 112 via wireless serving node 116.

In an aspect, UE 114 may include a balancing component 130, which may be configured to transmit data to the wireless serving node 116 over wireless link 125. Specifically, in an aspect, balancing component 130 of UE 114 may be configured to receive data packets 142, place the data packets 142 in an uncompressed uplink queue 140, and configure determining component 160 to determine whether an amount of data packets in a compressed uplink queue 150 fails to satisfy a grant threshold 164. Subsequently, balancing component 130 may configure transferring component 170 to transfer one or more of the data packets 142 to the compressed uplink queue 150 from the uncompressed uplink queue 140 based on the determining component 160 making a determination that the amount of data in the compressed uplink queue 150 fails to satisfy the grant threshold 164. In some instances, the amount of data in the compressed uplink queue 150 may correspond to the sum of compressed data packets 152 and uncompressed data packets 154. As such, the one or more of the data packets 142 transferred by the transferring component 170 to the compressed uplink queue 150 may be subsequently scheduled for transmission to a network entity, such as wireless serving node 116, as one or more uncompressed data packets 154.

In an alternative or additional aspect, the determining component 160 may determine that the amount of data in the compressed uplink queue 150 satisfies the grant threshold 164. As such, the balancing component 130 may configure compressing component 180 to compress one or more of the data packets 142 in into one or more compressed data packets 152. Thus, balancing component 130 may configure UE 114 to achieve a smooth uplink throughput on the PHY layer without under-utilization of the grant irrespective of compression gains and the bursty nature of the data packets 142 being received. As a result, a balance may be obtained between compression gains and overall delay, such as uplink data throughput and/or time.

UE 114 may comprise a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 116 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other base station, access point or cell having a substantially smaller transmit power or coverage area than a macro base station or cell.

Figure 2:
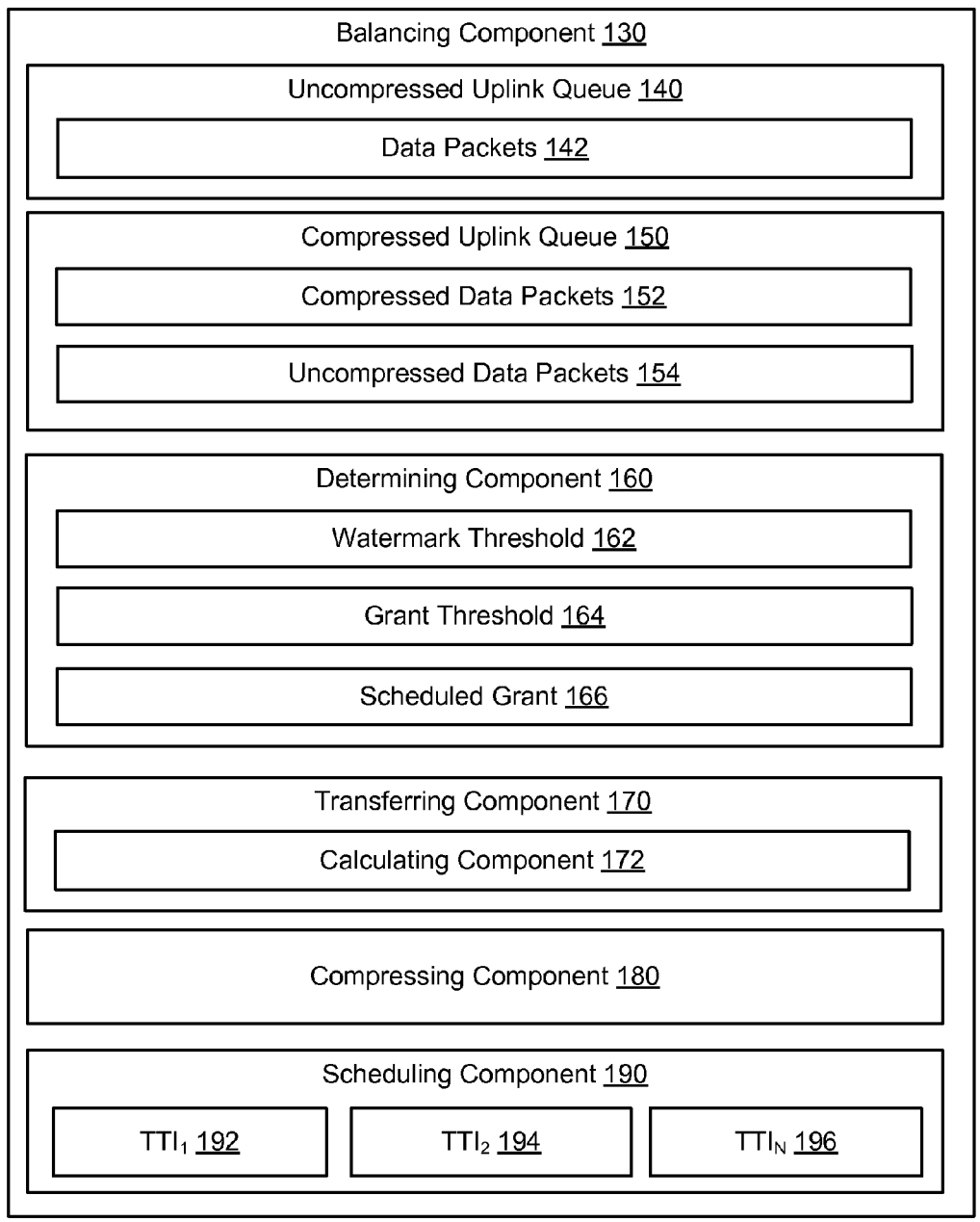
FIG. 2 is a schematic diagram of illustrating an exemplary aspect of a balancing component in a wireless communication system.

Referring to FIG. 2, a schematic diagram of an aspect of the balancing component 130, which may reside in UE 114 (FIG. 1), is described. Generally, UE 114 may reside in wireless communication system 100 (FIG. 1) and may be configured to introduce uncompressed data packets 154 in to compression flow when UE 114 is operating in compression mode. Compressed data packets 152 and/or uncompressed data packets 154 may include or be carried by signal 123 transmitted from UE 114 to network 112 over wireless link 125. In some instances, balancing component 130 may initialize compression mode. However, compressing data packets, such as data packets 142, requires an amount of time where by the data packets 142 are compressed into compressed data packets. In some instances, such as during bursty periods, a large amount of data may be introduced for transmission. In these instances, compressing will still require an amount of time to compress each of the data packets. In certain instances, the compression procedure may require an unusually long amount of time thereby causing a delay in transmission.

As such, balancing component 130 may introduce uncompressed data packets 154 in to the compressed uplink queue 150 to be scheduled for transmission to the network 112. For example, balancing component 130 may place a plurality of data packets 142 in an uncompressed uplink queue 140. Balancing component 130 may then determine that an amount of data packets in a compressed uplink queue 150 fails to satisfy a grant threshold 164, and as a result, transfer one or more of the plurality of data packets 142 to the compressed uplink queue 150 from the uncompressed uplink queue 140 based on the determination that the amount of data packets in the compressed uplink queue 150 fails to satisfy the grant threshold 164. Thus, the one or more of the plurality of data packets in the compressed uplink queue 150 are scheduled for transmission to the network entity (e.g., wireless serving node 116) as one or more uncompressed data packets 154.

In an aspect, balancing component 130 may include an uncompressed uplink queue 140, which may be configured to hold one or more data packets, such as data packets 142, to be transmitted to network 112 (FIG. 1). For example, balancing component 130 may place data packets 142 in the uncompressed uplink queue 140. In some instances, data packets 142 may be received from an application operating on UE 114, and the data packets 142 may be configured to be transmitted to network 112 (e.g., uplink transmission). In certain instances, uncompressed uplink queue 140 may be an Uplink Watermark Queue configured to operate as an entity between the Data layer and the Radio Link Control (RLC) layer, and may hold uplink data packets, such as Internet Protocol (IP) data packets. During compression mode, data packets 142 held in uncompressed uplink queue 140 are not transmitted to network 112 (FIG. 1). Instead, they are sent either to compressing component 180 or compressed uplink queue 150.

Further, in an aspect, balancing component 130 may include a compressed uplink queue 150, which may be configured to hold one or more data packets to be scheduled for transmission to network 112 (FIG. 1). For example, compressed uplink queue 150 may hold both compressed data packets 152 and/or uncompressed data packets 154. In some instances, balancing component 130 may be configured to transfer one or more data packets 142 from the uncompressed uplink queue 140 in to the compressed uplink queue 150, as uncompressed data packets 154, in order to minimize scheduled grant 166 underutilization by the UE 114. In other instances, compressed data packets 152 may be held by compressed uplink queue 150 after one or more data packets 142 have been compressed by compressing component 180. Nonetheless, the compressed data packets 152 and/or uncompressed data packets 154 held in compressed uplink queue 150 may be scheduled for transmission to the network 112 during compression mode. As such, during when UE 114 is in compression mode, compressed data packets 152 and/or uncompressed data packets 154 held in compressed uplink queue 150 are transmitted to network 112 (FIG. 1) instead of the data packets 142 held in uncompressed uplink queue 140.

Additionally, in an aspect, balancing component 130 may include a determining component 160, which may be configured to determine whether data held in either of the queues (e.g., uncompressed uplink queue 140 and/or compressed uplink queue 150) satisfy their respective corresponding thresholds. For example, determining component 160 may determine whether an amount of data in a compressed uplink queue 150 satisfies a grant threshold 164. The amount of data in the compressed uplink queue 150 may correspond to compressed data packets 152 and/or uncompressed data packets 154. The grant threshold 164 may correspond to and/or be based on the scheduled grant 166 for the UE 114, in that the grant threshold 164 is calculated based at least in part on an amount of scheduled grant 166 for the UE 114 by the network 112, wherein the amount of scheduled grant 166 corresponds to a maximum amount of data packets that the UE 114 is allowed to transmit during a set time period. The scheduled grant 166 may correspond to the serving grant that the UE 114 may use, such as the Absolute Grant Channel (AGCH) or the Enhanced AGCH (E-AGCH). The UE 114 and/or balancing component 130 may be configured to minimize the resource under-utilization in order to ensure that the scheduled grant 166 is not affected when UE 114 is in compression mode. Under-utilizing the scheduled grant 166 may cause the network 112 to reconfigure the scheduled grant 166 and thereby lessen the maximum data rate of the UE 114. As such, determining component 160 may use the grant threshold 164 to determine whether the UE 114 is under-utilizing the scheduled grant 166 by determining whether an amount of data in a compressed uplink queue 150 satisfies a grant threshold 164. In some instances, when the amount of data packets in the compressed uplink queue 150 (e.g., corresponding to at least one or both of compressed data packets 152 and uncompressed data packets 154 currently in the compressed uplink queue 150) satisfies the grant threshold 164, then determining component 160 may determine that there is no need to introduce uncompressed data packets 154 into the compression flow (e.g., transferring data packets 142 from the uncompressed uplink queue 140 to the compressed uplink queue 150 without compressing them first). As a result, one or more of the data packets 142 in the uncompressed uplink queue 140 are sent to compressing component 180 where they are compressed into compressed data packets 152. In other instances, determining component 160 may determine that the amount of data packets in the compressed uplink queue 150 fails to satisfy the grant threshold 164. As a result, determining component 160 may send an indication to transferring component 170 to transfer one or more of the plurality of data packets to the compressed uplink queue 150 from the uncompressed uplink queue 140.

In another aspect, determining component 160 may determine whether a plurality of data packets (e.g., data packets 142) satisfies a watermark threshold 162 corresponding to the uncompressed uplink queue 140. In some instances, the watermark threshold 162 may correspond to or be set based on the capabilities of UE 114 (FIG. 1) and/or the compression rate of compressing component 180 (FIG. 2). In these instances, determining whether a plurality of data packets (e.g., data packets 142) satisfies a watermark threshold 162 prevents the transferring component 170 from incorrectly and/or unnecessarily transferring one or more of the data packets 142 to the compressed uplink queue 150. For instance, when there is not enough data packets 142 (e.g., the amount of data packets 142 currently in uncompressed uplink queue 140 fails to satisfy the watermark threshold 162) then balancing component 130 and/or determining component 160 may be configured determine that the data packets 142 should be compressed by compressing component 180. As such, if it is determined that the plurality of data packets (e.g., data packets 142) satisfies the watermark threshold 162, then one or more of the plurality of data packets (e.g., data packets 142) are transferred from the uncompressed uplink queue 140 to the compressed uplink queue 150. Otherwise, if it is determined that the plurality of data packets (e.g., data packets 142) fails to satisfy the watermark threshold 162, then one or more of the plurality of data packets (e.g., data packets 142) are sent to compressing component 180 to be compressed into compressed data packets 152, which are then placed in compressed uplink queue 150.

Moreover, in an aspect, balancing component 130 may include a transferring component 170, which may be configured to transfer one or more of the plurality of data packets 142 to the compressed uplink queue 150 from the uncompressed uplink queue 140. For example, transferring component 170 may receive an indication from determining component 160 that the amount of data in the compressed uplink queue 150 fails to satisfy the grant threshold 164, and as a result, transfer one or more of the plurality of data packets 142 to the compressed uplink queue 150 from the uncompressed uplink queue 140. In some instances, transferring component 170 may include a calculating component 172, which may be configured to calculate a difference between the amount of data packets in the compressed uplink queue 150 and the grant threshold 164. The transferring component 170 may then use the calculation by transferring the one or more of the plurality of data packets to the compressed uplink queue 150 from the uncompressed uplink queue 140 equal the difference between the amount of data packets in the compressed uplink queue 150 and the grant threshold 164.

In a further aspect, balancing component 130 may include a compressing component 180, which may be configured to compress one or more of the plurality of data packets 142 into one or more compressed data packets 152. For example, during compression mode, compressing component 180 may receive one or more data packets 142 after determining component 160 determines that the plurality of data packets (e.g., data packets 142) satisfies the watermark threshold 162. Moreover, compressing component 180 may also receive one or more data packets 142 after determining component 160 determines that the amount of data packets in the compressed uplink queue 150 (e.g., corresponding to at least one or both of compressed data packets 152 and uncompressed data packets 154 currently in the compressed uplink queue 150) satisfies the grant threshold 164. Further, compression mode may be initialized, thereby initializing compression between the UE 114 and the network 112. As a result, a plurality of data packets 142 equal to the grant threshold 164 may be transferred to the compressed uplink queue 150 from the uncompressed uplink queue 140 in response to initializing compression between the UE 114 and the network 112. The plurality of data packets 142 are transmitted as a plurality of uncompressed data packets 154 while one or more of the data packets 142 are compressed by compressing component 180 in response to initializing compression. In certain instances, the amount of data packets 142 transferred to the compressed uplink queue 150 from the uncompressed uplink queue 140 in response to initializing compression may be any amount, such as but not limited to, an amount greater than the grant threshold 164 and/or an amount equal to the scheduled grant 166.

In other aspects, balancing component 130 may include a scheduling component 190, which may be configured to schedule one or more of the plurality of data packets in the compressed uplink queue 150 for transmission to a network entity (e.g., wireless serving node 116) in network 112. For example, scheduling component 190 may schedule only the data packets in the compressed uplink queue 150 for transmission during compression mode. In other instances, when UE 114 is not operating in compression mode, scheduling component 190 may schedule one or more of the plurality of data packets 142 in the uncompressed uplink queue 140 for transmission. In another instance, scheduling component 190 may schedule compressed data packets 152 and/or uncompressed data packets 154 held in the compressed uplink queue 150 during compression mode for transmission to the network 112.

In certain instances, when compressed data packets 152 and/or uncompressed data packets 154 are placed in the compressed uplink queue 150, scheduling component 190 may schedule the compressed data packets 152 and/or uncompressed data packets 154 for transmission to the network 112 in response to placing the compressed data packets 152 and/or uncompressed data packets 154 in the compressed uplink queue 150. The one or more uncompressed data packets 154 and the one or more compressed data packets 152 are scheduled to be transmitted in alternating transmission time intervals (TTIs), such as $TTI_1$ 192, $TTI_2$ 194, and $TTI_N$ 196, where N indicates an integer greater than 2. For example, if determining component 160 determines that the amount of data in the compressed uplink queue 150 fails to satisfy the grant threshold 164, and uncompressed data packets 154 are introduced into the compressed uplink queue 150, then a first of the uncompressed data packets 154 may be scheduled for transmission at $TTI_1$ 192. As such, one of the compressed data packets 152 may be scheduled for transmission at $TTI_2$ 194. The scheduling component 190 may alternate between uncompressed data packets 154 and compressed data packets 152 up to $TTI_N$ 196. The scheduling pattern does not need to be alternating, but may by an pattern scheduling component 190 is configured to execute.

Figure 3A:
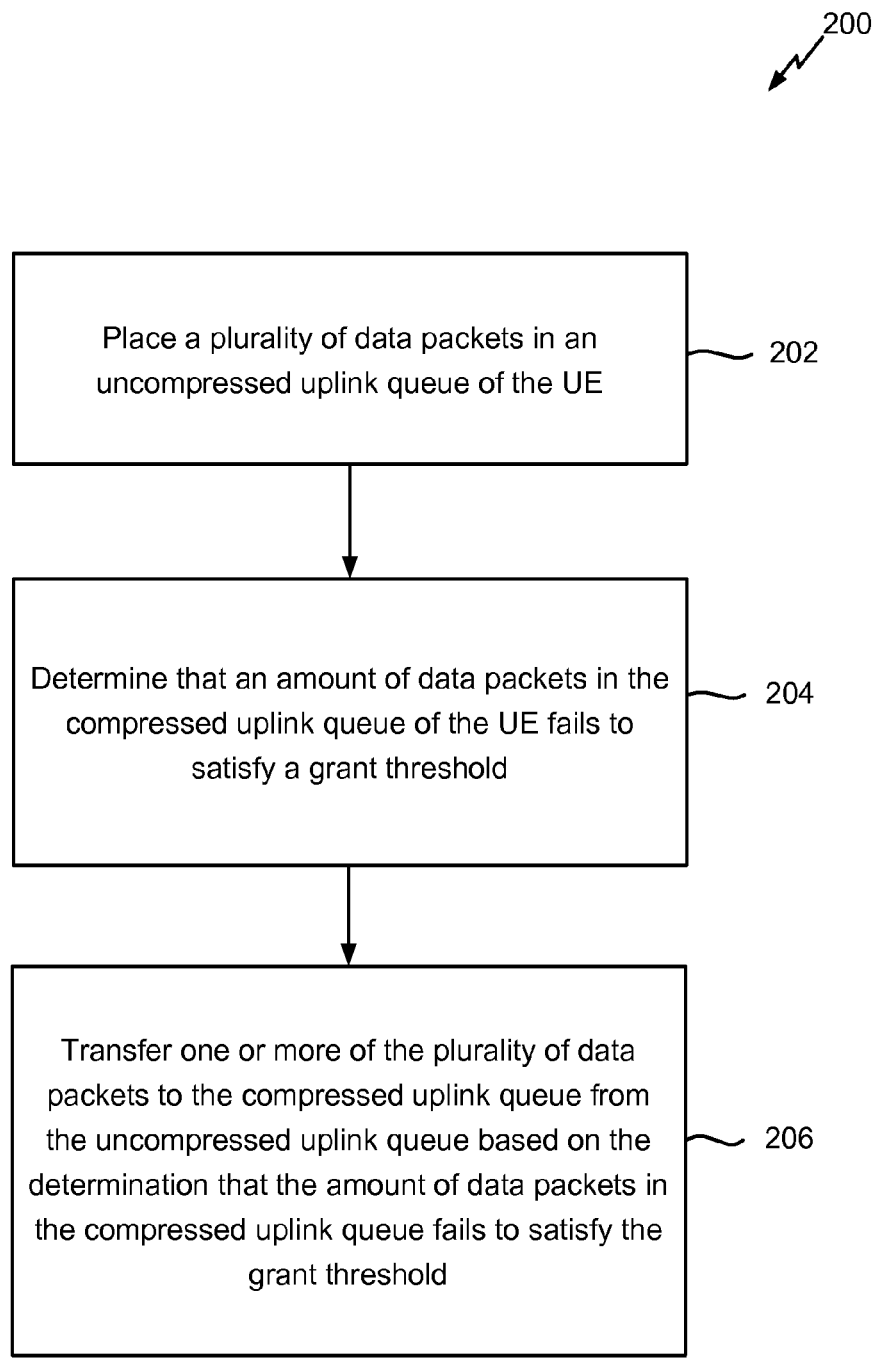
FIGS. 3A and 3B are flow diagrams of aspects of a method for introducing uncompressed data packets during compression in a wireless communication system.
Figure 3B:
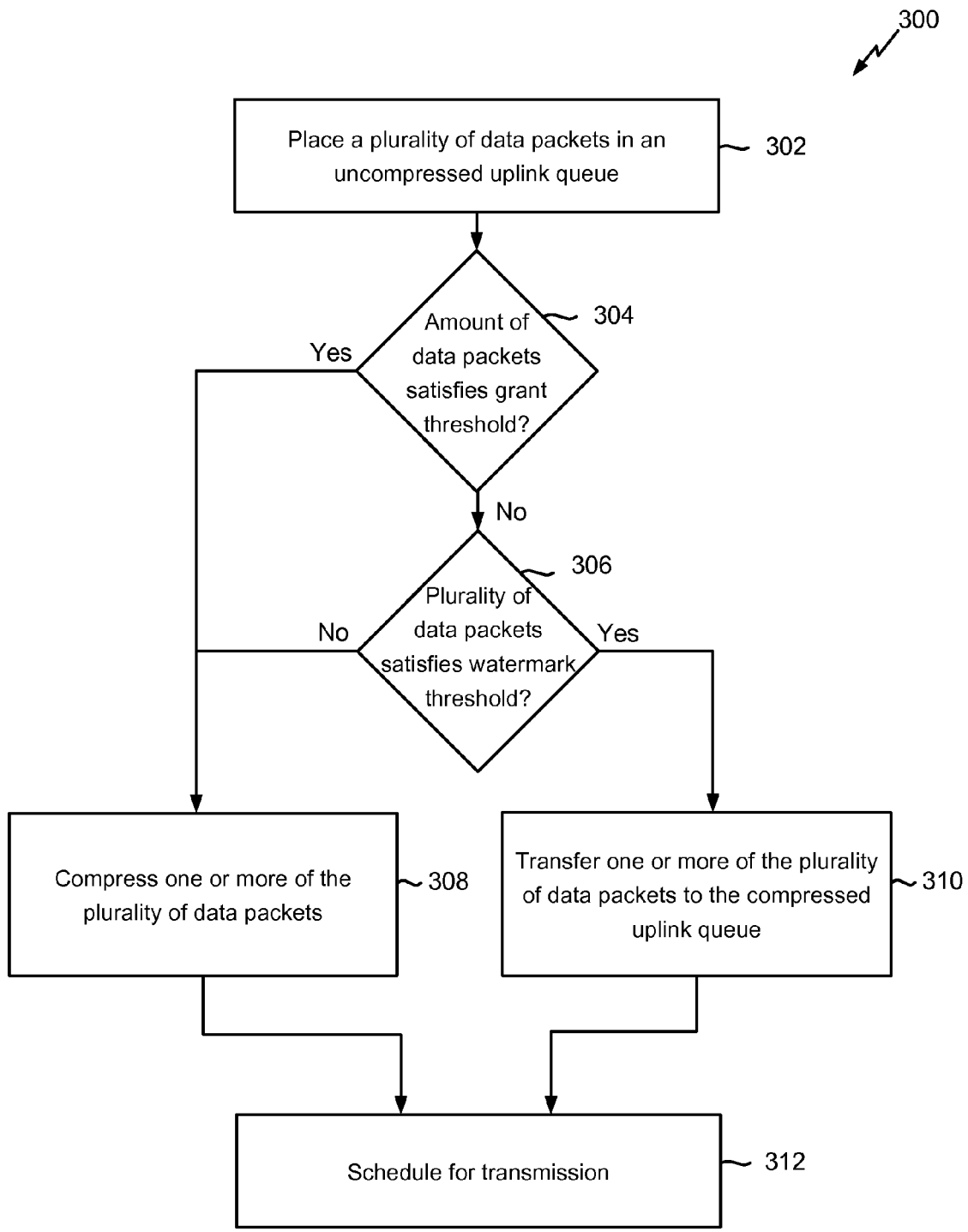

Referring to FIGS. 3A and 3B, in operation, a UE such as UE 114 (FIG. 2), or a network such as network 112 (FIG. 2) may perform one aspect of a methods 300/310 for introducing uncompressed data packets in to compression flow during compression. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

Referring to FIG. 3A, in an aspect, at block 202, method 200 includes placing a plurality of data packets in an uncompressed uplink queue of the UE. For example, as described herein, UE 114 (FIG. 1) may execute balancing component 130 (FIG. 2) to place a plurality of data packets 142 in an uncompressed uplink queue 140 of UE 114. In some instances, a user of UE 114 (FIG. 1) may be operating an application that results in an amount of bursty data (e.g., data packets 142) to be received by balancing component 130 for uplink transmission to the network 112.

Further, in an aspect, at block 204, method 200 includes determining that an amount of data packets in the compressed uplink queue of the UE fails to satisfy a grant threshold. For example, as described herein, balancing component 130 (FIG. 2) may execute determining component 160 to determine that an amount of data packets in the compressed uplink queue 150 of UE 114 fails to satisfy a grant threshold 164. In some instances, the amount of data packets in the compressed uplink queue 150 may correspond to at least one or both of compressed data packets 152 and uncompressed data packets 154 currently in the compressed uplink queue 150.

Additionally, in an aspect, at block 206, method 200 includes transferring one or more of the plurality of data packets to the compressed uplink queue from the uncompressed uplink queue based on the determination that the amount of data packets in the compressed uplink queue fails to satisfy the grant threshold. For example, as described herein, balancing component 130 (FIG. 2) may execute transferring component 170 to transfer one or more of the plurality of data packets to the compressed uplink queue 150 from the uncompressed uplink queue 140 based on the determination that the amount of data packets in the compressed uplink queue 150 fails to satisfy the grant threshold 164. In some instances, the one or more of the plurality of packets in the compressed uplink queue 150 are scheduled for transmission to a network entity (e.g., wireless serving node 116 of FIG. 1) as one or more uncompressed data packets 154.

Referring to FIG. 3B, a more detailed aspect of method 200 (FIG. 3A) is described. In an aspect, at block 302, method 300 includes placing a plurality of data packets in an uncompressed uplink queue. For example, as described herein, UE 114 (FIG. 1) may execute balancing component 130 (FIG. 2) to place a plurality of data packets 142 in an uncompressed uplink queue 140. In some instances, a user of UE 114 (FIG. 1) may be operating an application that results in an amount of bursty data (e.g., data packets 142) to be received by balancing component 130 for uplink transmission to the network 112.

Further, in an aspect, at block 304, method 300 includes determining whether an amount of data packets satisfies a grant threshold. For example, as described herein, balancing component 130 (FIG. 2) may execute determining component 160 to determine whether an amount of data packets in the compressed uplink queue 150 satisfies a grant threshold 164. In some instances, the amount of data packets in the compressed uplink queue 150 may correspond to at least one or both of compressed data packets 152 and uncompressed data packets 154 currently in the compressed uplink queue 150. In other instances, the grant threshold 164 may correspond to or set based on the scheduled grant 166 of UE 114 (FIG. 1). As such, if at block 304, it is determined that the amount of data packets satisfies the grant threshold 164, then method 300 may proceed to block 308. However, if at block 304, it is determined that the amount of data packets fails to satisfy the grant threshold 164, then method 300 may proceed to block 306.

In another aspect, at block 306, method 300 includes determining whether a plurality of data packets satisfies a watermark threshold. For example, as described herein, balancing component 130 (FIG. 2) may execute determining component 160 to determine whether a plurality of data packets (e.g., data packets 142) satisfies a watermark threshold 162 corresponding to the uncompressed uplink queue 140. In some instances, the watermark threshold 162 may correspond to or be set based on the capabilities of UE 114 (FIG. 1) and/or the compression rate of compressing component 180 (FIG. 2). In these instances, determining whether a plurality of data packets (e.g., data packets 142) satisfies a watermark threshold 162 prevents the transferring component 170 from incorrectly and/or unnecessarily transferring one or more of the data packets 142 to the compressed uplink queue 150. For instance, when there is not enough data packets 142 (e.g., the amount of data packets 142 currently in uncompressed uplink queue 140 fails to satisfy the watermark threshold 162) then balancing component 130 and/or determining component 160 may be configured determine that the data packets 142 should be compressed by compressing component 180. As such, if at block 306, it is determined that the plurality of data packets (e.g., data packets 142) satisfies the watermark threshold 162, then method 300 may proceed to block 310. However, if at block 306, it is determined that the plurality of data packets (e.g., data packets 142) fails to satisfy the watermark threshold 162, then method 300 may proceed to block 308.

Additionally, in an aspect, at block 308, method 300 includes compressing one or more of the plurality of data packets. For example, as described herein, balancing component 130 (FIG. 2) may execute compressing component 180 to compress one or more of the plurality of data packets (e.g., data packets 142) into compressed data packets 152. In some instances, when the amount of data packets in the compressed uplink queue 150 (e.g., corresponding to at least one or both of compressed data packets 152 and uncompressed data packets 154 currently in the compressed uplink queue 150) satisfies the grant threshold 164, then balancing component 130 and/or determining component 160 may determine that there is no need to introduce uncompressed data packets 154 into the compression flow (e.g., transferring data packets 142 from the uncompressed uplink queue 140 to the compressed uplink queue 150 without compressing them first). As a result, one or more of the data packets 142 in the uncompressed uplink queue 140 are sent to compressing component 180 where they are compressed into compressed data packets 152. Additionally, when there is not enough data packets 142 (e.g., the amount of data packets 142 currently in uncompressed uplink queue 140 fails to satisfy the watermark threshold 162) then balancing component 130 and/or determining component 160 may be configured determine that the data packets 142 should be compressed by compressing component 180.

In a further aspect, at block 310, method 300 includes transferring one or more of the plurality of data packets to the compressed uplink queue. For example, as described herein, balancing component 130 (FIG. 2) may execute transferring component 170 to transfer one or more of the plurality of data packets (e.g., data packets 142) from the uncompressed uplink queue 140 to the compressed uplink queue 150. In an instance, the one or more of the plurality of data packets transferred to the compressed uplink queue 150 are uncompressed data packets 154 (e.g., they are not compressed by compressing component 180 into compressed data packets 152). As such, compressed uplink queue 150 may comprise at least one or both of compressed data packets 152 and uncompressed data packets 154.

In an aspect, at block 312, method 300 includes scheduling for transmission any data packets in the compressed data queue. For example, as described herein, balancing component 130 (FIG. 2) may execute scheduling component 190 to schedule the data (e.g., at least one or both of compressed data packets 152 and uncompressed data packets 154) for transmission to network 112 (FIG. 1) via wireless serving node 116. In some instances, when compressed uplink queue 150 comprises both compressed data packets 152 and uncompressed data packets 154 during compressed mode, then uncompressed data packets 154 will be transmitted along with compressed data packets 152. In certain instances, the amount of data allowed to be transmitted (e.g., bandwidth) may correspond to and/or be based on the scheduled grant 166 of UE 114 (FIG. 1).

Figure 4:
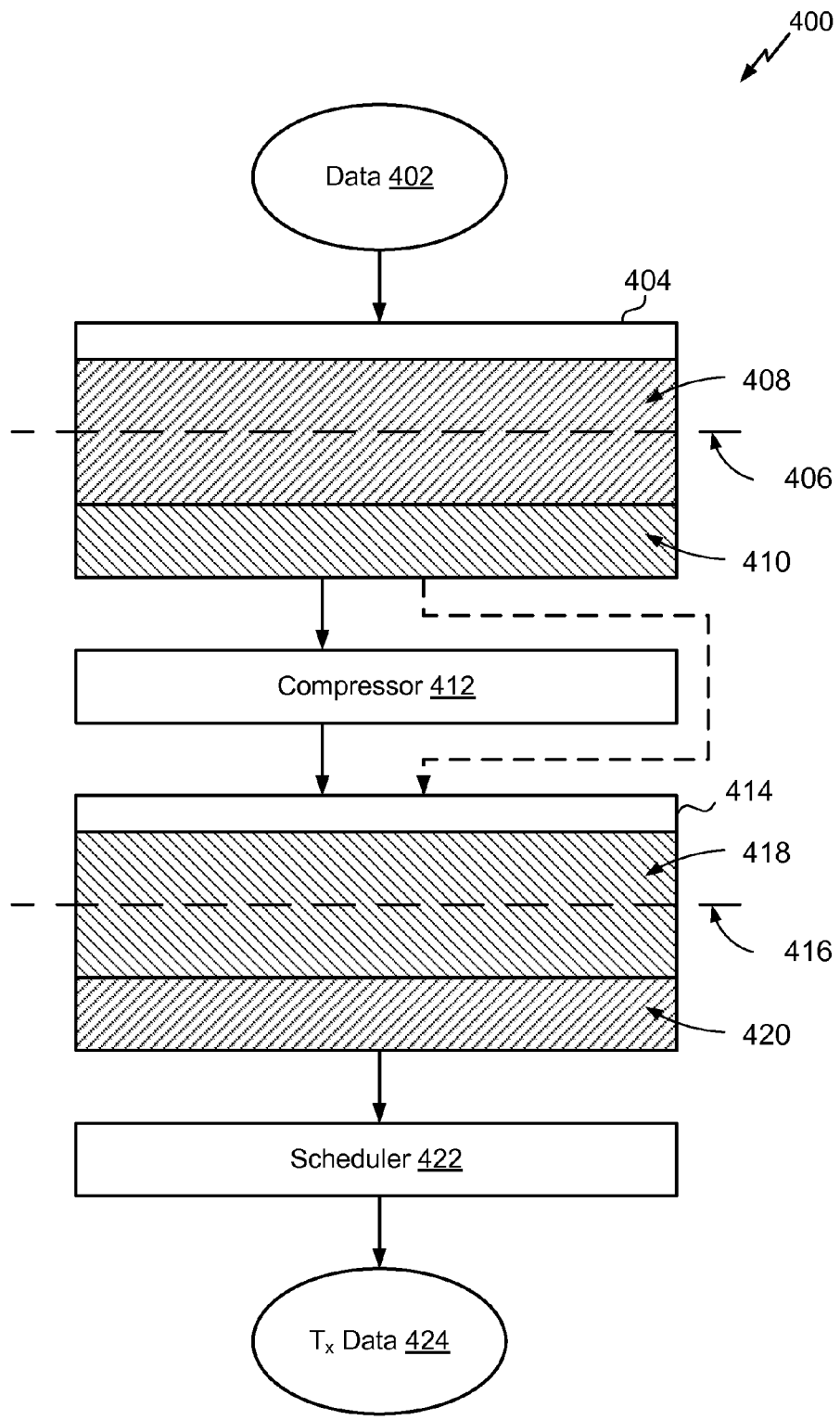
FIG. 4 is a conceptual diagram illustrating aspects of introducing uncompressed data packets during compression in a wireless communication system.

Referring to FIG. 4, a conceptual diagram 400 illustrating various aspects of introducing uncompressed data packets in to compression flow during compression. For example, in an aspect, data 402, such as data packets 142 (FIG. 1) may be received by UE 114 and/or balancing component 130 from an application operating on UE 114. As such, the balancing component 130 may place data 402 in to an uncompressed uplink queue, such as uncompressed uplink queue 404, which may be similar to uncompressed uplink queue 140 (FIG. 1). In some instances, uncompressed uplink queue 404 may have a watermark threshold 162, wherein the watermark threshold 162 corresponds to a minimum amount of data the uncompressed uplink queue 404 is required to maintain before one or more of the data 402 is allowed to be transferred out of it. Furthermore, UE 114 (FIG. 1) and/or balancing component 130 may be configured to maintain a compressed uplink queue, such as compressed uplink queue 414, which may be similar to compressed uplink queue 150 (FIG. 1). Similarly, compressed uplink queue 414 may include a grant threshold 416, wherein the grant threshold 416 may correspond to and/or be based on a scheduled grant 166 (FIG. 1) of the UE 114.

In an aspect, the balancing component 130 (FIG. 1) and/or determining component 160 may be configured to determine whether an amount of data in the compressed uplink queue 414 satisfies a grant threshold 416. In some instances, the amount of data may correspond to an amount 418 and/or an amount 420. As shown in FIG. 4, the amount 418, in combination with amount 420, in the compressed uplink queue 414 exceeds the grant threshold 416. However, if compressed uplink queue 414 only comprises amount 420, and not amount 418, then compressed uplink queue 414 will fail to satisfy the grant threshold 416. As such, if balancing component 130 (FIG. 1) and/or determining component 160 determine that the amount of data in compressed uplink queue 414 fails to satisfy the grant threshold 416, then balancing component 130 (FIG. 1) and/or determining component 160 may then determine whether the amount of data in uncompressed uplink queue 404 satisfies the watermark threshold 406. In some instances, the amount of data may correspond to an amount 408 and/or an amount 410. As shown in FIG. 4, the amount 408, in combination with amount 410, in the uncompressed uplink queue 404 exceeds the watermark threshold 406. However, if uncompressed uplink queue 404 only comprises amount 410, and not amount 408, then uncompressed uplink queue 404 will fail to satisfy the watermark threshold 406. As such, if balancing component 130 (FIG. 1) and/or determining component 160 determine that the amount of data in uncompressed uplink queue 404 satisfies the watermark threshold 406 then balancing component 130 and/or transferring component 170 may transfer one or more of the data in the uncompressed uplink queue 404 to the compressed uplink queue 414, as denoted by the dotted line pointing the direction from uncompressed uplink queue 404 to the compressed uplink queue 414 in FIG. 4. As a result, the data in compressed uplink queue 414 may then be scheduled for transmission by a scheduler, such as scheduler 422, which may be similar to scheduling component 190 (FIG. 2). Thus, the UE 114 may transmit data 424 to network 112 (FIG. 1) as both compressed data and/or uncompressed data.

In the alternative, if balancing component 130 (FIG. 1) and/or determining component 160 determine that the amount of data in compressed uplink queue 414 satisfies the grant threshold 416 and/or if balancing component 130 (FIG. 1) and/or determining component 160 determine that the amount of data in uncompressed uplink queue 404 fails to satisfy the watermark threshold 406, then balancing component 130 and/or a compressor, such as compressor 412, which may be similar to compressing component 180 (FIG. 1), may be configured to compressed one or more of the data in uncompressed uplink queue 404 in to compressed data. The compressed data may then be placed in to compressed uplink queue 414 and may then be scheduled for transmission by scheduler 422.

Figure 5:
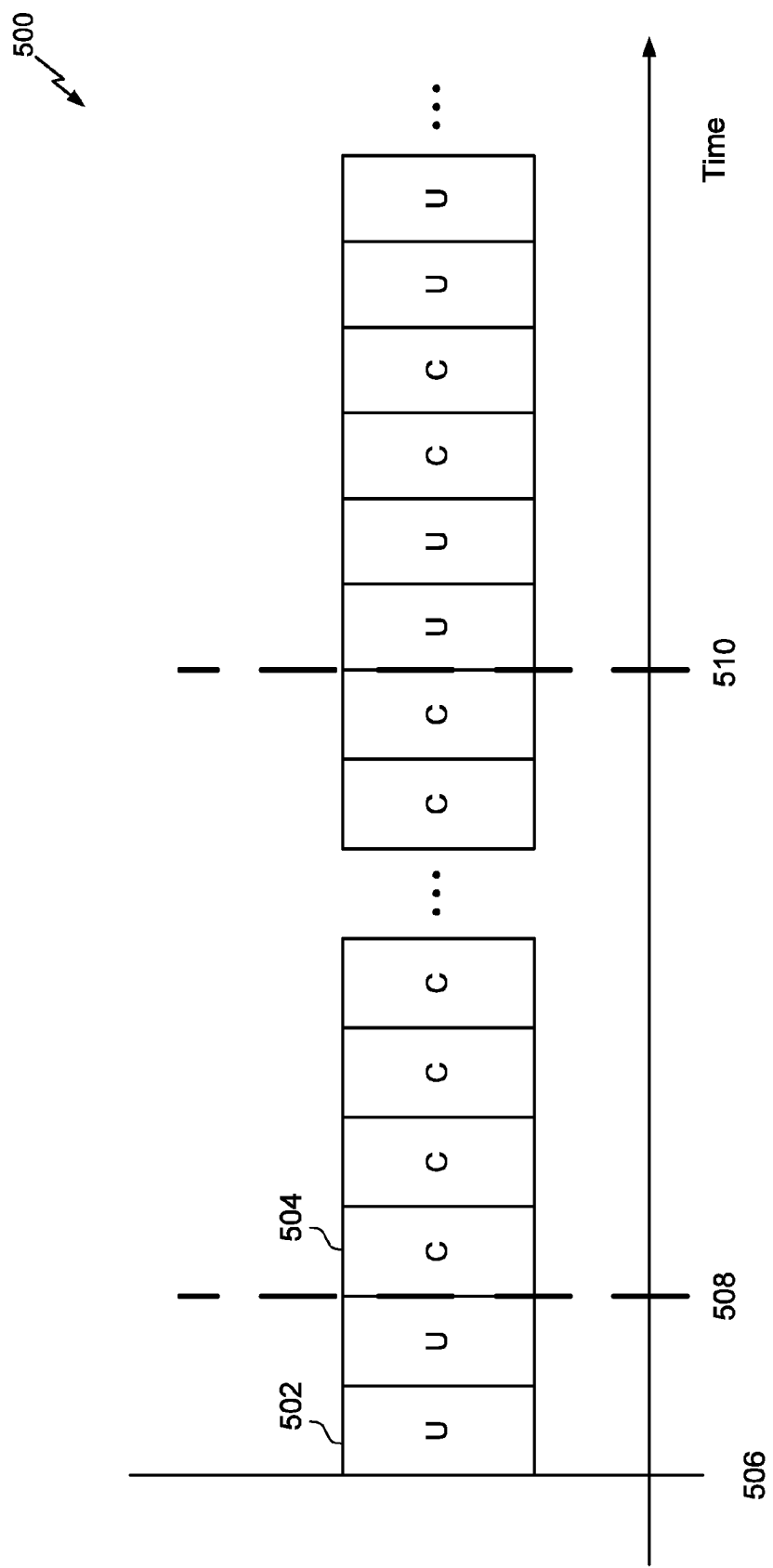
FIG. 5 is a conceptual diagram illustrating aspects of introducing uncompressed data packets during compression in a wireless communication system.

Referring to FIG. 5, a conceptual diagram 500 illustrating various aspects of introducing uncompressed data packets in to compression flow during compression. For example, UE 114 (FIG. 1) and/or balancing component 130 may initialize compression mode thereby causing compressing component 180 to begin compressing data packets 142 in the uncompressed uplink queue 140. However, compressing data packets, such as data packets 142, requires a certain amount of time during which the data packets 142 are received by the compressing component 180 and compressed into compressed data packets, such as compressed data packets 152. In some instances, such as during bursty periods, a large amount of data may be placed in to uncompressed uplink queue 140. In these instances, the compressing component 180 will still require an amount of time to compress each of the data packets in the uncompressed uplink queue 140. In certain instances, the compression procedure performed by compressing component 180 to compress the data packets, such as data packets 142, may require an unusually long amount of time thereby causing a delay in transmission of the compressed data packets 152. As such, UE 114 (FIG. 1) and/or balancing component 130 may introduce uncompressed data packets 154 in to the compressed uplink queue 150 to be scheduled for transmission to the network 112.

In an aspect, FIG. 5 depicts the scheduling of uncompressed data packets 502 in the compressed uplink queue 150 with compressed data packets 504 over a period of time (e.g., the time may be depicted in TTI's). In some instances, uncompressed data packets 502 may be similar to uncompressed data packets 154 (FIG. 1), and compressed data packets 504 may be similar to compressed data packets 152 (FIG. 1). For example, at time 506, UE 114 and/or balancing component 130 may initialize compression mode for communicating compressed data packets 504 to the network 112 (FIG. 1). However, since the compressing component 180 (FIG. 1) may require some time to initialize and compress the first few data packets, and since the compressed uplink queue 150 may be empty (e.g., failing to satisfy the grant threshold 164), UE 114 and/or balancing component 130 may place one or more uncompressed data packets 502 in to the compressed uplink queue 150 to be scheduled for transmission while the data packets are being compressed. FIG. 5 depicts, in a non-limiting example, that two uncompressed data packets 502 are placed in the compressed uplink queue 150 while compressing component 180 finishes initialization. At time 508, UE 114 and/or balancing component 130 may determine that compressing component 180 finishes initializing and/or the amount of compressed data packets 504 in compressed uplink queue 150 satisfies the grant threshold 164. As such, UE 114 and/or balancing component 130 may then stop transferring or queuing uncompressed data packets 502 in the compressed uplink queue 150, and begin exclusively scheduling compressed data packets 504 for transmission.

However, at time 510, UE 114 and/or balancing component 130 may determine that the amount of data in the compressed uplink queue 150 fails to satisfy the grant threshold 164. As a result, UE 114 and/or balancing component 130 may then begin transferring uncompressed data packets 502 in to the compressed uplink queue 150 to be scheduled for transmission. For example, UE 114 and/or balancing component 130 may alternate the scheduling of uncompressed data packets 502 and compressed data packets 504 after the amount of data in compressed uplink queue 150 fails to satisfy the grant threshold 164. FIG. 5 depicts, in a non-limiting example, that the UE 114 and/or balancing component 130 may alternate scheduling of two uncompressed data packets 502 and two compressed data packets 504. Alternating the scheduling of uncompressed data packets 502 and compressed data packets 504 allows for the compressing component 180 to compress the data packets in the uncompressed uplink queue 140 while maintaining uplink throughput. The scheduling of data packets for transmission may conform to any number of schemes or patterns, such as switching between compressed data packets 504 and uncompressed data packets 502 based on the grant threshold 164, etc. Nonetheless, UE 114 and/or balancing component 130 may schedule uncompressed data packets 502 indefinitely or until the compressed uplink queue 150 once again satisfies the grant threshold 164.

Figure 6:
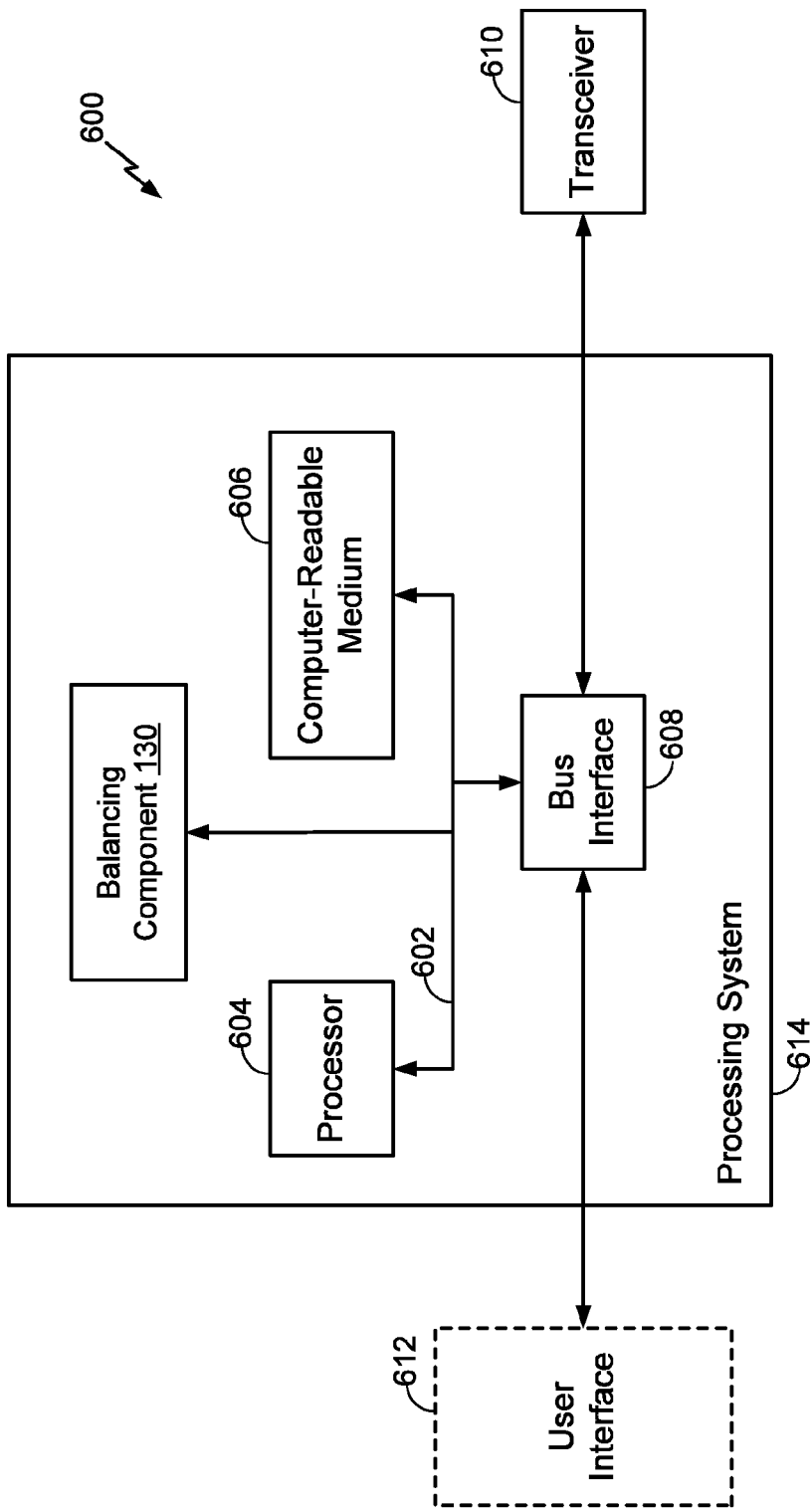
FIG. 6 is a block diagram of an aspect of a hardware implementation for an apparatus employing a processing system to perform the functions described herein.

FIG. 6 is a conceptual diagram illustrating an example of a hardware implementation for an apparatus 600 employing a processing system 614. In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, and computer-readable media, represented generally by the computer-readable medium 606. The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

Figure 7:
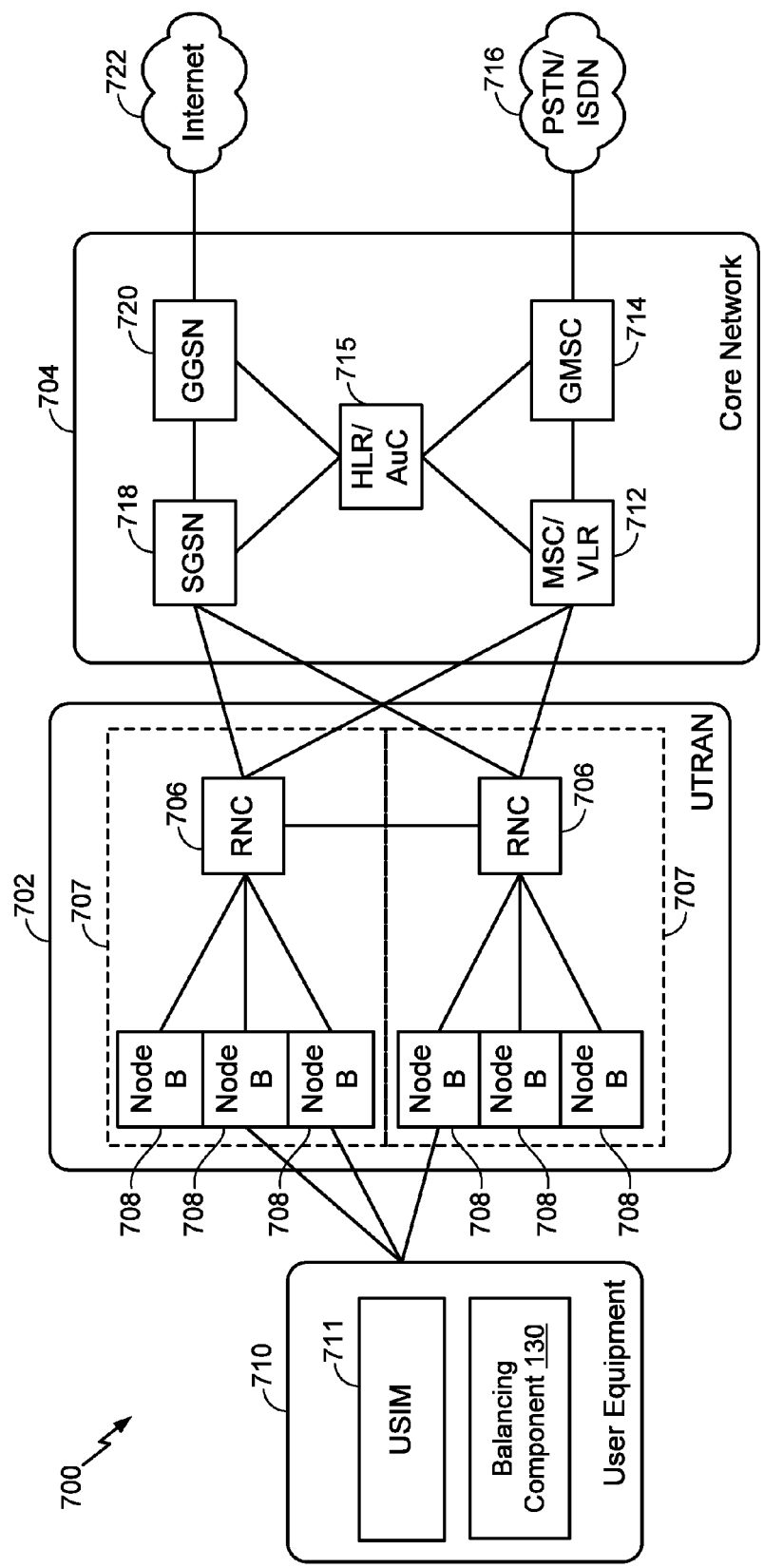
FIG. 7 is a block diagram conceptually illustrating an example of a telecommunications system including a UE configured to perform the functions described herein.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708 may be considered as including a physical (PHY) layer and a medium access control (MAC) layer. Further, communication between a UE 710 and an RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each SRNS 707; however, the SRNSs 707 may include any number of wireless Node Bs. The Node Bs 708 provide wireless access points to a core network (CN) 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The downlink (DL), also called the forward link, refers to the communication link from a Node B 708 to a UE 710, and the uplink (UL), also called the reverse link, refers to the communication link from a UE 710 to a Node B 708.

The core network 704 interfaces with one or more access networks, such as the UTRAN 702. As shown, the core network 704 is a GSM core network. However, as those skilled in the art will recognize, the various concepts presented throughout this disclosure may be implemented in a RAN, or other suitable access network, to provide UEs with access to types of core networks other than GSM networks.

The core network 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a visitor location register (VLR) that contains subscriber-related information for the duration that a UE is in the coverage area of the MSC 712. The GMSC 714 provides a gateway through the MSC 712 for the UE to access a circuit-switched network 716. The core network 704 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The core network 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 708 and a UE 710. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 8:
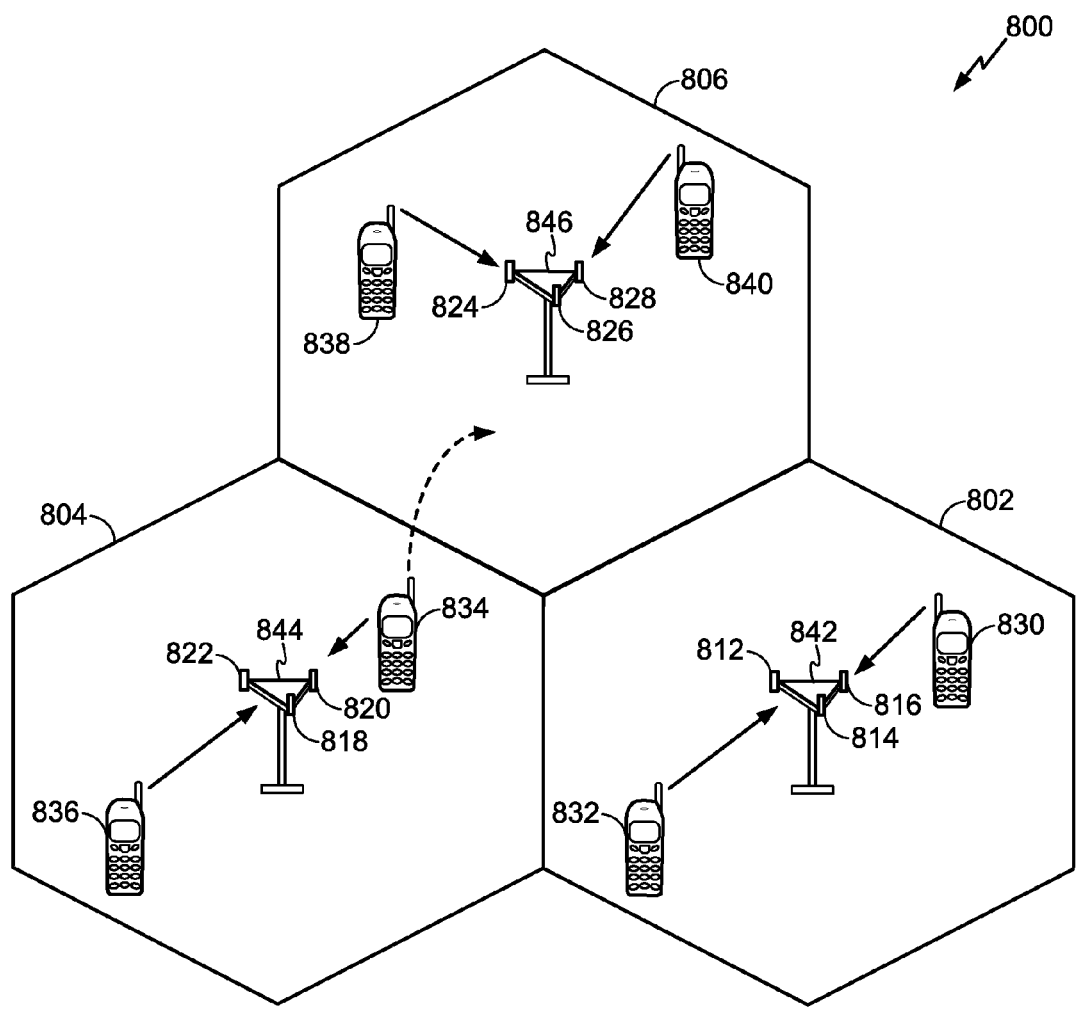
FIG. 8 is a conceptual diagram illustrating an example of an access network for use with a UE configured to perform the functions described herein.

Referring to FIG. 8, an access network 800 in a UTRAN architecture is illustrated. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with Node B 842, UEs 834 and 836 may be in communication with Node B 844, and UEs 838 and 840 can be in communication with Node B 846. Here, each Node B 842, 844, 846 is configured to provide an access point to a core network 704 (see FIG. 7) for all the UEs 830, 832, 834, 836, 838, 840 in the respective cells 802, 804, and 806.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (see FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 9.

Figure 9:
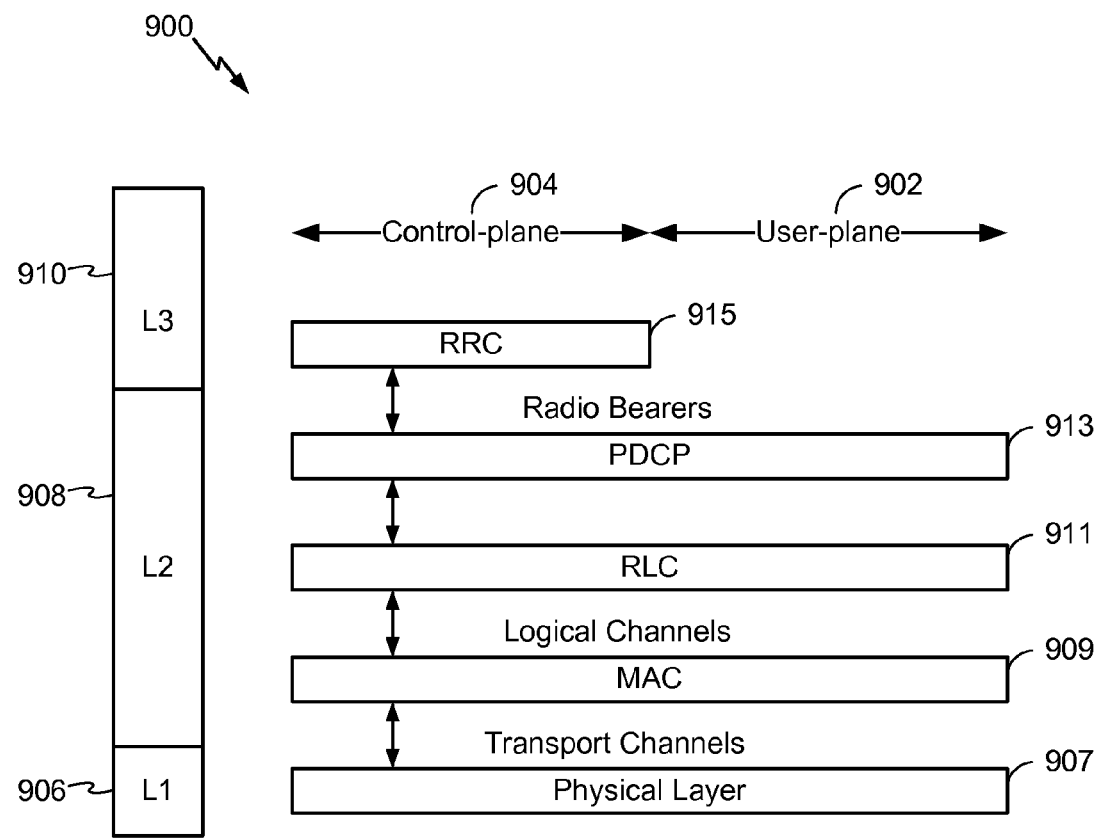
FIG. 9 is a conceptual diagram illustrating an example of a radio protocol architecture for the user and control planes for a base station and/or a UE configured to perform the functions described herein.

Referring to FIG. 9 an example radio protocol architecture 900 relates to the user plane 902 and the control plane 904 of a user equipment (UE) or node B/base station. For example, architecture 900 may be included in a UE such as wireless device 10 (FIG. 1). The radio protocol architecture 900 for the UE and node B is shown with three layers: Layer 1 906, Layer 2 908, and Layer 3 910. Layer 1 906 is the lowest lower and implements various physical layer signal processing functions. As such, Layer 1 906 includes the physical layer 907. Layer 2 (L2 layer) 908 is above the physical layer 907 and is responsible for the link between the UE and node B over the physical layer 907. Layer 3 (L3 layer) 910 includes a radio resource control (RRC) sublayer 915. The RRC sublayer 915 handles the control plane signaling of Layer 3 between the UE and the UTRAN.

In the user plane, the L2 layer 908 includes a media access control (MAC) sublayer 909, a radio link control (RLC) sublayer 911, and a packet data convergence protocol (PDCP) 913 sublayer, which are terminated at the node B on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 913 provides multiplexing between different radio bearers and logical channels. The PDCP sublayer 913 also provides header compression for upper layer data packets to reduce radio transmission overhead, security by ciphering the data packets, and handover support for UEs between node Bs. The RLC sublayer 911 provides segmentation and reassembly of upper layer data packets, retransmission of lost data packets, and reordering of data packets to compensate for out-of-order reception due to hybrid automatic repeat request (HARQ). The MAC sublayer 909 provides multiplexing between logical and transport channels. The MAC sublayer 909 is also responsible for allocating the various radio resources (e.g., resource blocks) in one cell among the UEs. The MAC sublayer 909 is also responsible for HARQ operations.

Figure 10:
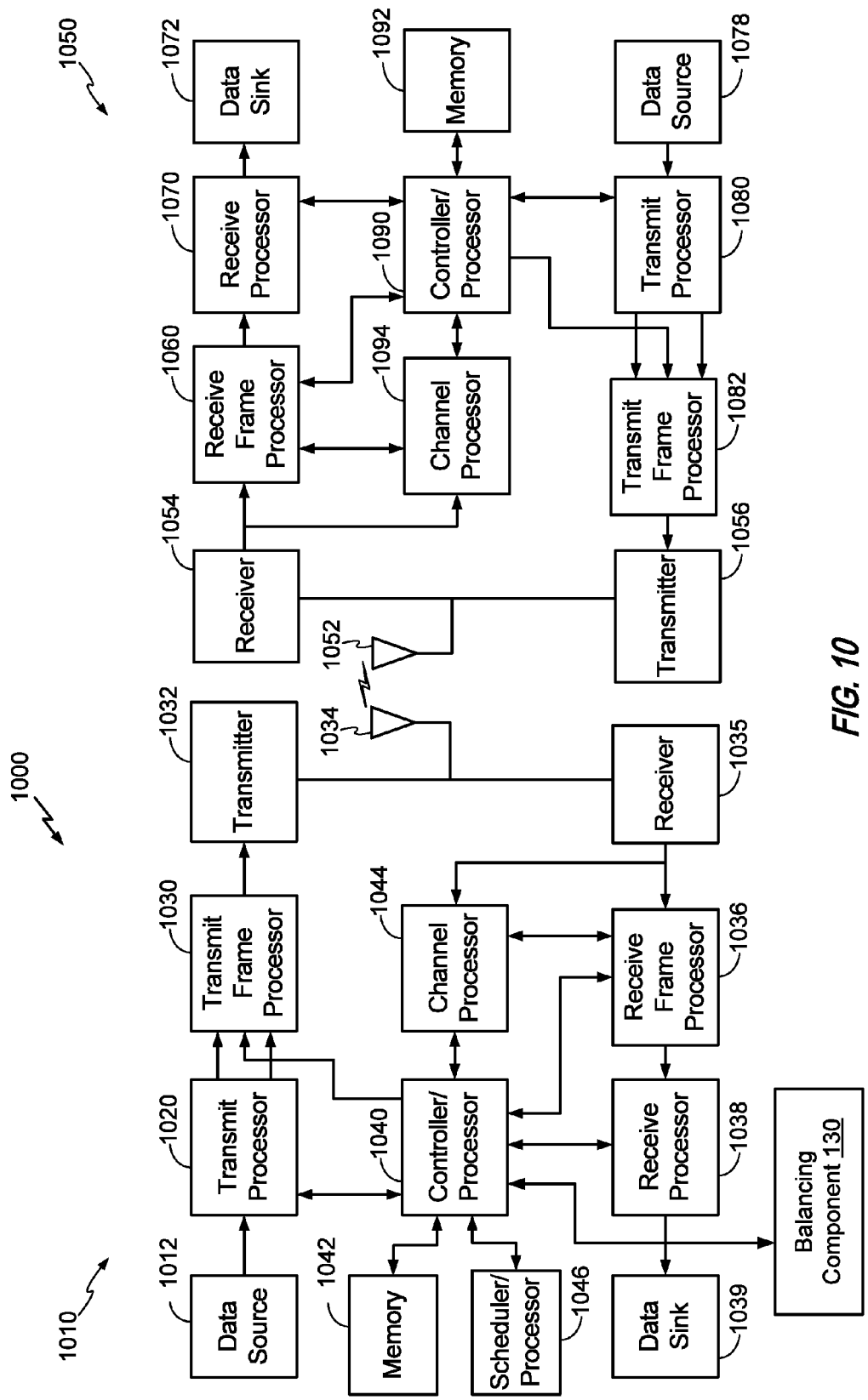
FIG. 10 is a block diagram conceptually illustrating an example of a Node B in communication with a UE in a telecommunications system configured to perform the functions described herein.

FIG. 10 is a block diagram of a Node B 1010 in communication with a UE 1050, where the Node B 1010 may be the Node B 708 in FIG. 7, and the UE 1050 may be the UE 710 in FIG. 7. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

Several aspects of a telecommunications system have been presented with reference to an HSPA system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of introducing uncompressed data packets into a compression flow during compression for communication between a user equipment (UE) and a network entity, comprising:
    placing a plurality of data packets in an uncompressed uplink queue of the UE;
    determining that an amount of data packets in a compressed uplink queue of the UE fails to satisfy a grant threshold; and
    transferring one or more of the plurality of data packets to the compressed uplink queue from the uncompressed uplink queue based on the determination that the amount of data packets in the compressed uplink queue fails to satisfy the grant threshold,
    wherein the one or more of the plurality of data packets in the compressed uplink queue are scheduled for transmission to the network entity as one or more uncompressed data packets.

2. The method of claim 1, further comprising:
    determining that the plurality of data packets in the uncompressed uplink queue satisfies a watermark threshold,
    wherein transferring the one or more of the plurality of data packets to the compressed uplink queue from the uncompressed uplink queue is further based on the determination that the plurality of data packets in the uncompressed uplink queue satisfies the watermark threshold.

3. The method of claim 1, further comprising:
    determining that the plurality of data packets in the uncompressed uplink queue fails to satisfy a watermark threshold; and
    compressing one or more of the plurality of data packets into one or more compressed data packets based on the determination that the plurality of data packets in the uncompressed uplink queue fails to satisfy the watermark threshold.

4. The method of claim 1, further comprising:
    determining that the amount of data packets in the compressed uplink queue satisfies the grant threshold; and
    compressing one or more of the plurality of data packets into one or more compressed data packets based on the determination that the amount of data packets in the compressed uplink queue satisfies the grant threshold.

5. The method of claim 4, further comprising:
    placing the one or more compressed data packets in the compressed uplink queue; and
    scheduling the one or more compressed data packets for transmission to the network entity in response to placing the one or more compressed data packets in the compressed uplink queue.

6. The method of claim 5, wherein the one or more uncompressed data packets and the one or more compressed data packets are scheduled to be transmitted in alternating transmission time intervals (TTIs).

7. The method of claim 1, wherein the grant threshold is calculated based at least in part on an amount of grant scheduled for the UE by the network entity, wherein the amount of grant scheduled corresponds to a maximum amount of data packets that the UE is allowed to transmit during a set time period.

8. The method of claim 1, further comprising:
calculating a difference between the amount of data packets in the compressed uplink queue and the grant threshold,
wherein the one or more of the plurality of data packets transferred to the compressed uplink queue from the uncompressed uplink queue equals the difference between the amount of data packets in the compressed uplink queue and the grant threshold.

9. The method of claim 1, further comprising:
initializing compression between the UE and the network entity;
transferring a second plurality of data packets equal to the grant threshold to the compressed uplink queue from the uncompressed uplink queue in response to initializing compression between the UE and the network entity,
wherein the second plurality of data packets are transmitted as a plurality of uncompressed data packets while one or more data packets are compressed in response to initializing compression between the UE and the network entity.

10. The method of claim 1, wherein the amount of data packets in the compressed uplink queue corresponds to an amount of uncompressed data packets and compressed data packets in the compressed uplink queue.

11. A non-transitory computer-readable medium storing computer executable code for introducing uncompressed data packets into a compression flow during compression for communication between a user equipment (UE) and a network entity, comprising:
code for placing a plurality of data packets in an uncompressed uplink queue of the UE;
code for determining that an amount of data packets in a compressed uplink queue of the UE fails to satisfy a grant threshold; and
code for transferring one or more of the plurality of data packets to the compressed uplink queue from the uncompressed uplink queue based on the determination that the amount of data packets in the compressed uplink queue fails to satisfy the grant threshold,
wherein the one or more of the plurality of data packets in the compressed uplink queue are scheduled for transmission to the network entity as one or more uncompressed data packets.

12. The non-transitory computer-readable medium of claim 11, further comprising:
code for determining that the plurality of data packets in the uncompressed uplink queue satisfies a watermark threshold,
wherein transferring the one or more of the plurality of data packets to the compressed uplink queue from the uncompressed uplink queue is further based on the determination that the plurality of data packets in the uncompressed uplink queue satisfies the watermark threshold.

13. The non-transitory computer-readable medium of claim 11, further comprising:
code for determining that the plurality of data packets in the uncompressed uplink queue fails to satisfy a watermark threshold; and
code for compressing one or more of the plurality of data packets into one or more compressed data packets based on the determination that the plurality of data packets in the uncompressed uplink queue fails to satisfy the watermark threshold.

14. The non-transitory computer-readable medium of claim 11, further comprising:
code for determining that the amount of data packets in the compressed uplink queue satisfies the grant threshold; and
code for compressing one or more of the plurality of data packets into one or more compressed data packets based on the determination that the amount of data packets in the compressed uplink queue satisfies the grant threshold.

15. The non-transitory computer-readable medium of claim 14, further comprising:
code for placing the one or more compressed data packets in the compressed uplink queue; and
code for scheduling the one or more compressed data packets for transmission to the network entity in response to placing the one or more compressed data packets in the compressed uplink queue.

16. An apparatus for introducing uncompressed data packets into a compression flow during compression for communication between a user equipment (UE) and a network entity, comprising:
means for placing a plurality of data packets in an uncompressed uplink queue of the UE;
means for determining that an amount of data packets in a compressed uplink queue of the UE fails to satisfy a grant threshold; and
means for transferring one or more of the plurality of data packets to the compressed uplink queue from the uncompressed uplink queue based on the determination that the amount of data packets in the compressed uplink queue fails to satisfy the grant threshold,
wherein the one or more of the plurality of data packets in the compressed uplink queue are scheduled for transmission to the network entity as one or more uncompressed data packets.

17. The apparatus of claim 16, further comprising:
means for determining that the plurality of data packets in the uncompressed uplink queue satisfies a watermark threshold,
wherein transferring the one or more of the plurality of data packets to the compressed uplink queue from the uncompressed uplink queue is further based on the determination that the plurality of data packets in the uncompressed uplink queue satisfies the watermark threshold.

18. The apparatus of claim 16, further comprising:
means for determining that the plurality of data packets in the uncompressed uplink queue fails to satisfy a watermark threshold; and
means for compressing one or more of the plurality of data packets into one or more compressed data packets based on the determination that the plurality of data packets in the uncompressed uplink queue fails to satisfy the watermark threshold.

19. The apparatus of claim 16, further comprising:
means for determining that the amount of data packets in the compressed uplink queue satisfies the grant threshold; and
means for compressing one or more of the plurality of data packets into one or more compressed data packets based on the determination that the amount of data packets in the compressed uplink queue satisfies the grant threshold.

20. The apparatus of claim 19, further comprising:
means for placing the one or more compressed data packets in the compressed uplink queue; and means for scheduling the one or more compressed data packets for transmission to the network entity in response to placing the one or more compressed data packets in the compressed uplink queue.

21. An apparatus for introducing uncompressed data packets into a compression flow during compression for communication between a user equipment (UE) and a network entity, comprising:
 a balancing component configured to place a plurality of data packets in an uncompressed uplink queue of the UE;
 a determining component configured to determine that an amount of data packets in a compressed uplink queue of the UE fails to satisfy a grant threshold; and
 a transferring component configured to transfer one or more of the plurality of data packets to the compressed uplink queue from the uncompressed uplink queue based on the determination that the amount of data packets in the compressed uplink queue fails to satisfy the grant threshold,
 wherein the one or more of the plurality of data packets in the compressed uplink queue are scheduled for transmission to the network entity as one or more uncompressed data packets.

22. The apparatus of claim 21, wherein the determining component is further configured to determine that the plurality of data packets in the uncompressed uplink queue satisfies a watermark threshold,
 wherein the transferring component is further configured to transfer the one or more of the plurality of data packets to the compressed uplink queue from the uncompressed uplink queue based on the determination that the plurality of data packets in the uncompressed uplink queue satisfies the watermark threshold.

23. The apparatus of claim 21, wherein the determining component is further configured to determine that the plurality of data packets in the uncompressed uplink queue fails to satisfy a watermark threshold; and
 a compressing component configured to compress one or more of the plurality of data packets into one or more compressed data packets based on the determination that the plurality of data packets in the uncompressed uplink queue fails to satisfy the watermark threshold.

24. The apparatus of claim 21, wherein the determining component is further configured to determine that the amount of data packets in the compressed uplink queue satisfies the grant threshold; and
 a compressing component configured to compress one or more of the plurality of data packets into one or more compressed data packets based on the determination that the amount of data packets in the compressed uplink queue satisfies the grant threshold.

25. The apparatus of claim 24, wherein the balancing component is configured to place the one or more compressed data packets in the compressed uplink queue; and
 a scheduling component configured to schedule the one or more compressed data packets for transmission to the network entity in response to placing the one or more compressed data packets in the compressed uplink queue.

26. The apparatus of claim 25, wherein the scheduling component is further configured to schedule the one or more uncompressed data packets and the one or more compressed data packets in alternating transmission time intervals (TTIs).

27. The apparatus of claim 21, wherein the determining component is further configured to calculate the grant threshold based at least in part on an amount of grant scheduled for the UE by the network entity, wherein the amount of grant scheduled corresponds to a maximum amount of data packets that the UE is allowed to transmit during a set time period.

28. The apparatus of claim 21, further comprising:
 a calculating component configure to calculate a difference between the amount of data packets in the compressed uplink queue and the grant threshold,
 wherein the one or more of the plurality of data packets transferred to the compressed uplink queue from the uncompressed uplink queue equals the difference between the amount of data packets in the compressed uplink queue and the grant threshold.

29. The apparatus of claim 21, wherein the balancing component is configured to initialize compression between the UE and the network entity,
 wherein the transferring component is further configured to transfer a second plurality of data packets equal to the grant threshold to the compressed uplink queue from the uncompressed uplink queue in response to initializing compression between the UE and the network entity,
 wherein the second plurality of data packets are transmitted as a plurality of uncompressed data packets while one or more data packets are compressed in response to initializing compression between the UE and the network entity.

30. The apparatus of claim 21, wherein the amount of data packets in the compressed uplink queue corresponds to an amount of uncompressed data packets and compressed data packets in the compressed uplink queue.

* * * * *